US006940279B2

(12) United States Patent
Chong et al.

(10) Patent No.: US 6,940,279 B2
(45) Date of Patent: Sep. 6, 2005

(54) TRANSFER FUNCTION FOR TRACK AVERAGE AMPLITUDE PREDICTION

(75) Inventors: FongKheon Chong, Singapore (SG); Edward YinKong Hew, Singapore (SG); SanYuan Liew, Singapore (SG); CheeFong Oh, Malaysia (MY); YoiSeng Yee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 79 days.

(21) Appl. No.: 10/421,241

(22) Filed: Apr. 23, 2003

(65) Prior Publication Data

US 2004/0212361 A1 Oct. 28, 2004

(51) Int. Cl.[7] ............................................... G01R 33/12
(52) U.S. Cl. ........................................................ 324/210
(58) Field of Search ................................ 324/210, 212, 324/262, 537; 360/31, 77.02, 46, 53; 29/603.01, 603.03, 603.04, 593; 369/53.1, 53.16

(56) References Cited

U.S. PATENT DOCUMENTS

| 4,904,938 A | 2/1990 | O'Reilly |
| 4,949,036 A | 8/1990 | Bezinque |
| 5,589,777 A | 12/1996 | Davis |
| 5,600,500 A | 2/1997 | Madsen |
| 5,844,742 A | * 12/1998 | Yarmchuk et al. ............. 360/75 |
| 5,969,894 A | * 10/1999 | Howell et al. ................. 360/51 |
| 5,987,634 A | * 11/1999 | Behrens et al. ............. 714/719 |
| 6,005,731 A | * 12/1999 | Foland et al. ................. 360/53 |
| 6,249,890 B1 | * 6/2001 | Ukani et al. ................. 714/721 |
| 6,445,519 B1 | 9/2002 | Weinstein |
| 6,459,260 B1 | 10/2002 | Bonin |
| 6,467,153 B2 | 10/2002 | Butts |
| 6,472,866 B2 | 10/2002 | Aslami |
| 6,657,803 B1 | * 12/2003 | Ling et al. ..................... 360/53 |

OTHER PUBLICATIONS

Gordon F. Hughes, Joseph F. Murray, Kenneth Kreutz–Delgado and Charles Elkan, "Improved Disk–Drive Failure Warnings," IEEETransactions on reliability, vol. 51 ( No. 3), p. 8, (Sep. 3, 2002).

Martin Rowe, "Measure A Disk–Drive's Read Channel Signals," Test & Measurement World (Newton, MA), p. 1–8, (Aug. 1, 1999).

* cited by examiner

*Primary Examiner*—Jay Patidar
*Assistant Examiner*—Reena Aurora
(74) *Attorney, Agent, or Firm*—Kirk A. Cesari

(57) ABSTRACT

A method and apparatus produce a read signal using a read head. A variable gain value is set that is used by a variable gain amplifier to amplify the read signal. The variable gain value is used to determine whether the head is functioning properly.

15 Claims, 3 Drawing Sheets

TRANSFER FUNCTION FOR TRACK AVERAGE AMPLITUDE PREDICTION

FIELD OF THE INVENTION

The present invention relates generally to read heads, and more particularly but not by limitation to testing read heads used in devices such as data storage devices.

BACKGROUND OF THE INVENTION

Data retrieval devices retrieve bits of data that have been stored on a recordable medium by passing a read head over the medium. Typically, the read head detects a physical property of a portion of the media such as the direction of a magnetic domain or the optical reflectance of the media in order to detect the data stored on the media. The detection of this property results in a read signal.

In order for a retrieval device to operate properly, it is critical that the read head generate a read signal within an acceptable amplitude range. In order to determine if a head will produce an acceptable signal, it is common to measure the head's track average amplitude (TAA), which refers to the average peak-to-peak amplitude of the pulses produced by the read head from a pattern on the media. The optimal value of this measurement depends on the density of the pattern and the sensitivity of the read-channel. If the TAA is too high, the read head may saturate, which distorts the waveforms in the read signal. If the TAA is too low, the signal-to-noise ratio in the read signal will be too low, causing random bit errors.

In the prior art, in order to avoid placing low performing read heads into a device, it has been common to test the read heads before they are assembled into the device. This typically involves connecting test equipment to the output conductors of the heads and measuring the signals generated by the heads. Although such testing removes heads that fail the test, it has been recognized that some heads can pass this screening test yet still perform poorly when integrated into the retrieval device. To address this problem, the prior art has repeated the track average amplitude testing after the heads have been integrated into the retrieval device. This typically involves connecting probes of an external testing system to the output conductors of a common preamplifier in the retrieval device that is connected to each of the heads.

Such testing is undesirable because it requires external test equipment and because it requires a significant amount of time to connect the test equipment to the lines containing the read signal. Thus, a system is needed that allows for testing of the head without requiring external test equipment and without requiring that probes be connected to conductors exiting the device's preamplifier.

Embodiments of the present invention provide solutions to these and other problems, and offer other advantages over the prior art.

SUMMARY OF THE INVENTION

A method and apparatus produce a read signal using a read head. A variable gain value is set that is used by a variable gain amplifier to amplify the read signal. The variable gain value is used to determine whether the head is functioning properly.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
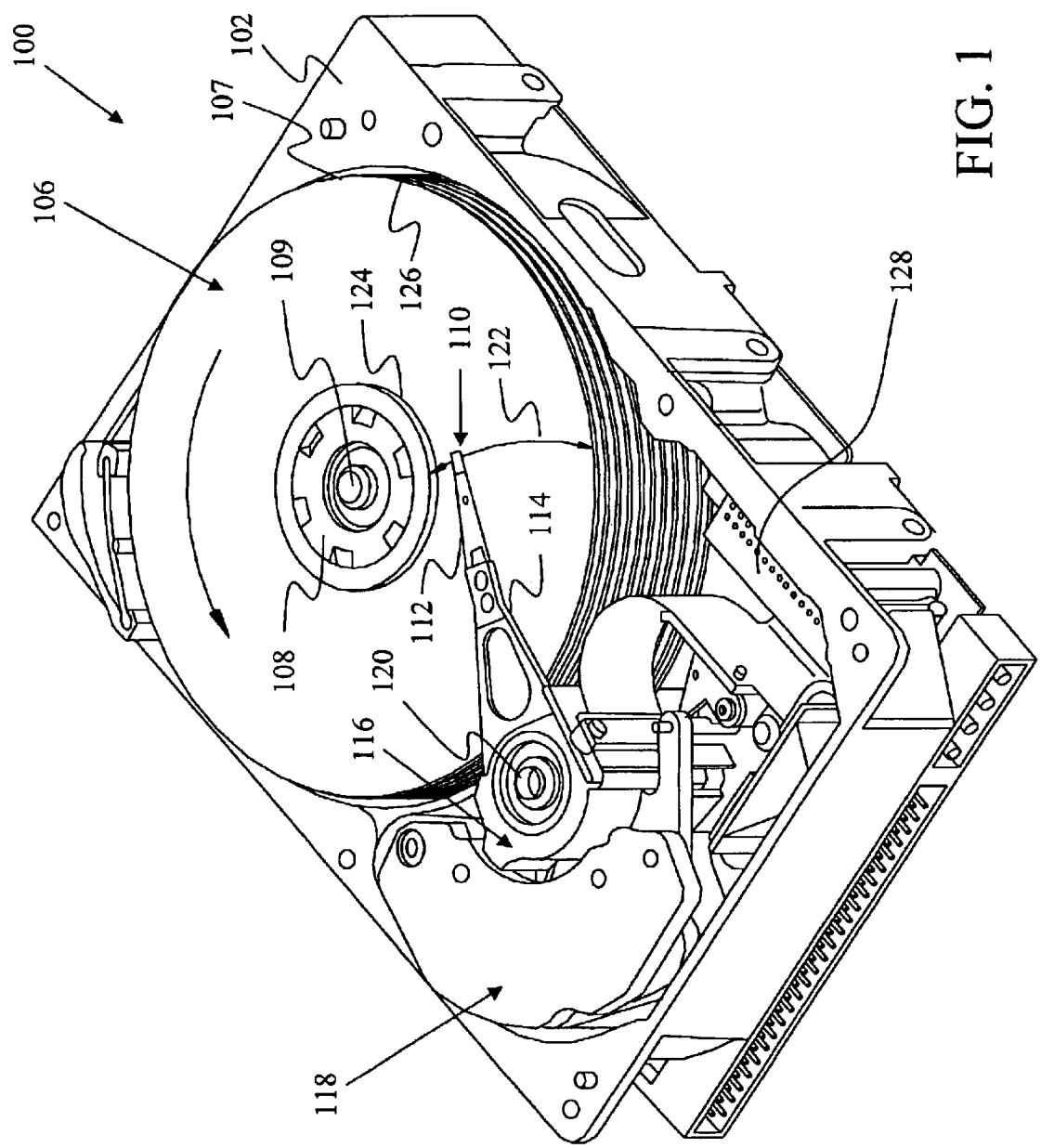
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110, which is mounted to disc drive 100 for communication with the disc surface. In the example shown in FIG. 1, sliders 110 are supported by suspensions 112, which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates pivot housing 116 with its attached heads 110 about a pivot shaft 120 to position heads 110 over a desired data track along an arcuate path 122 between a disc inner diameter 124 and a disc outer diameter 126. Voice coil motor 118 is driven by servo electronics, also known as controller, 128 based on signals generated by heads 110 and a host computer (not shown).

Figure 2:
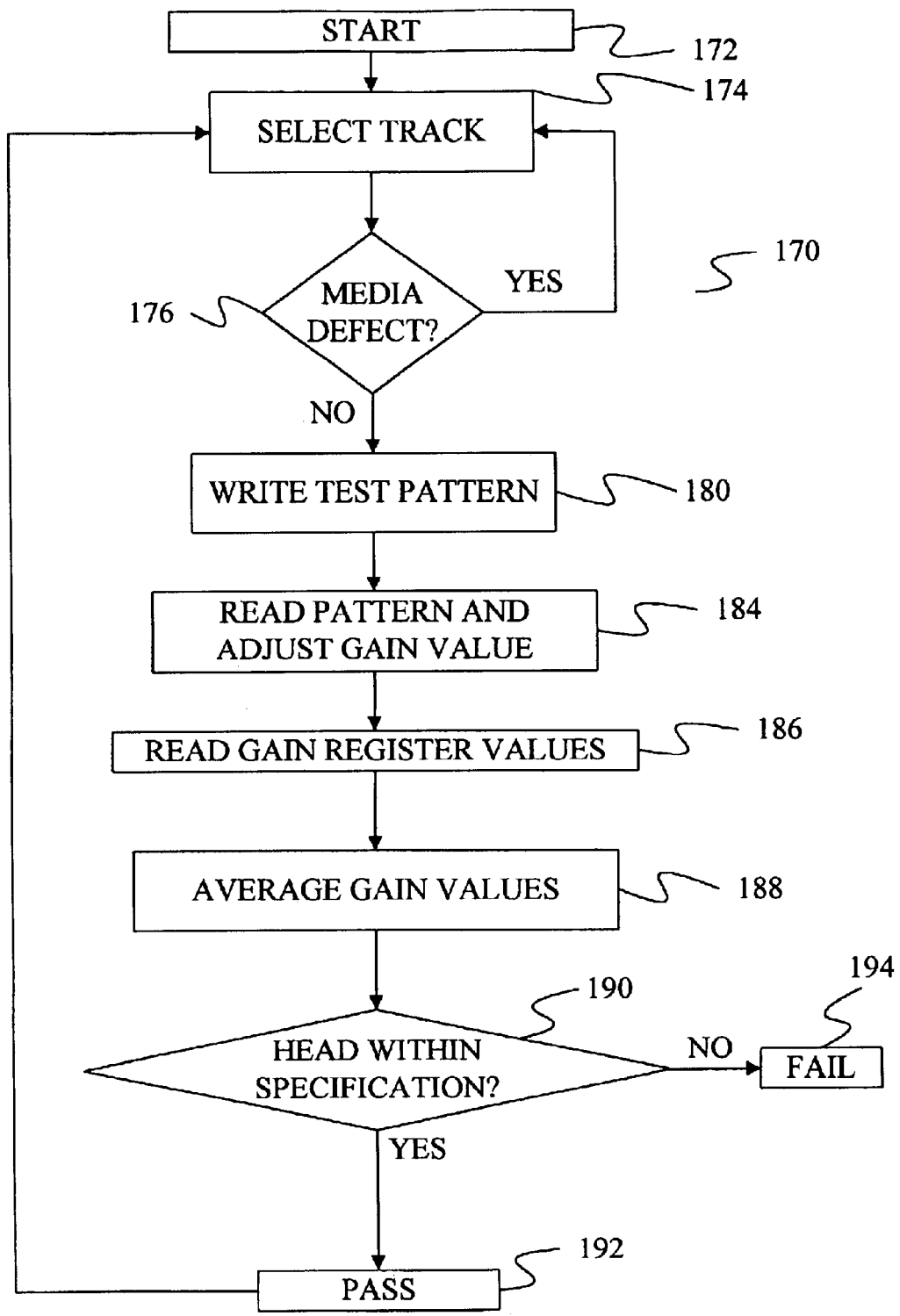
FIG. 2 is a block diagram illustrating steps of the test method.
Figure 3:
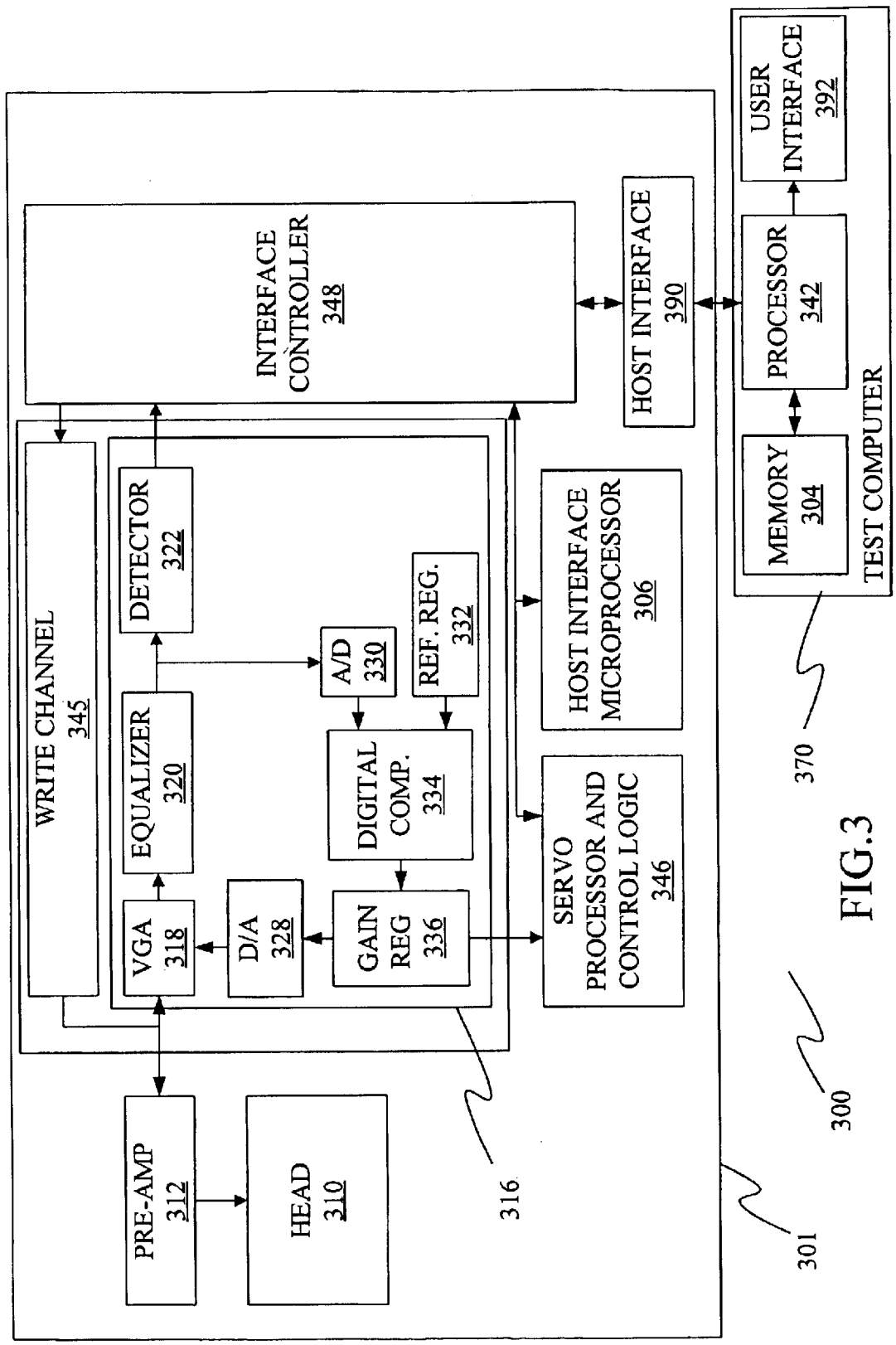
FIG. 3 is a block diagram of a disc drive of coupled to a test computer.

FIG. 2 illustrates a flow chart 170 of a method of testing a device having a read head to determine whether the read head has adequate amplitude. The method illustrated in FIG. 2 can be completed rapidly without making actual measurements of track average amplitude (TAA) of a read signal with an oscilloscope or similar measuring device. The process illustrated in FIG. 2 can be performed using firmware (or a combination of firmware and software) such as shown in the example illustrated in FIG. 3 to determine whether the read head in the device is operating properly. In the embodiment of FIG. 3, a test system 300 includes a test computer 370 and a storage device 301 that is being tested. A processor 342 in test computer 370 controls the testing and interacts with storage device 301 through a host interface 390.

The method illustrated in FIG. 2 begins at start 172 and proceeds to step 174 where a suitable track for testing is identified by processor 342 of test computer 370. Step 176 includes determining whether the track can accept data by determining if the track contains a media defect. If the track is found to contain a media defect, the process returns to step 174 where processor 342 selects a new track.

If the track is found to be defect free, the method proceeds to step 180 where a test pattern is written to the track. The test pattern can have a frequency in the low, middle, or high frequency range or have a random frequency. However, the preferred range is a pattern in the mid-frequency range, such as a 2T pattern. To write the pattern, processor 342 sends 2T data through host interface 390 to interface controller 348. Interface controller 348 passes the data to write channel 345, which converts the data into a single analog signal that is passed through pre-amplifier 312 to the appropriate head 310. Note that if write channel 345 includes a scrambling or encoding circuit, this circuit should be bypassed or disabled so that the 2T pattern is written correctly. Based on the analog signal from pre-amplifier 312, head 310 writes the 2T pattern to the disc.

Under many embodiments, the pattern is written to tracks at different radial positions along the disc. In one particular embodiment, the pattern is written at an inner diameter of the disc near the spindle, at a middle diameter of the disc and at an outer diameter of the disc. Note that in other embodiments, the 2T pattern can be pre-written into the media before the media is installed in the storage device.

Once the pattern has been written to the disc, the process continues at step 184, where a read signal is generated by passing head 310 over the test pattern in the selected tracks. The read signal that is generated by head 310 passes into pre-amplifier 312 where it is amplified. The amplified read signal then passes into read channel 316.

Read channel 316 includes a variable gain amplifier (VGA) 318, an equalizer 320, and a detector 322. The amplified read signal is amplified by variable gain amplifier 318 based on a gain value stored in a gain register 336 that is converted into an analog value by digital to analog converter 328. The amplified signal is equalized by equalizer 320 so that the equalized signal approaches a desired channel characteristic. Note that equalizer 320 is optional but is generally used in partial response channels. The equalized signal is passed to detector 322, which decodes the equalized signal to generate a set of binary values. These values are then passed to interface controller 348, which checks the data for errors before passing it to host interface 390.

In order for detector 322 to operate properly, the equalized signal provided to the detector should have a consistent maximum amplitude. To ensure a consistent amplitude, read channel 316 uses an automatic gain control (AGC) module consisting of VGA 318, equalizer 320, analog-to-digital converter 330, reference register 332, digital comparator 334, gain register 336 and digital-to-analog converter 328. In operation, analog-to-digital converter 330 periodically samples the output signal of equalizer 320 to generate a digital value that is indicative of the amplitude of the equalized signal. This digital value is provided to digital comparator 334 together with a target or reference amplitude stored in reference register 332. If the amplitude of the equalized signal is below the reference amplitude, digital comparator 334 increases the gain value stored in gain register 336. If the amplitude of the equalized signal is above the reference amplitude, digital comparator 334 reduces the gain value stored in gain register 336.

As noted above, the gain value in gain register 336 is used to set the amplification level of variable gain amplifier 318. Thus, increasing the gain value increase the amplification and thus increases the amplitude of the equalized signal while decreasing the gain value decreases the amplification and thus decreases the amplitude of the equalized signal. Note that the feedback loop of the AGC module is designed so that it corrects only slowly varying or low frequency changes and is not responsive to high frequency content.

During the read operation, the gain values in gain register 336 are periodically read by servo processor and control logic 346 as indicated at step 186. Although steps 184 and 186 are shown as two separate steps, they occur at the same time. Servo processor and control logic 346 passes the gain values to a host interface microprocessor 306, which forwards them through interface controller 348 and host interface 390 to processor 342. Processor 342 stores the gain values in a memory 304 for later processing. In one embodiment, gain values are measured for each of the track locations where the pattern was written, such as the inner diameter track, the middle diameter track, and the outer diameter track.

At step 188, processor 342 averages the gain values for each track to produce an average gain value for each track. At step 190, processor 342 uses the average gain values for each track to determine whether the head is performing properly.

Under one embodiment, the determination of whether the head is operating properly is based on a correlation the present inventors discovered between track average amplitude and average gain values. In particular, the present inventors have discovered that there is an inverse relationship between the track average amplitude (TAA) and the average gain value. Experimentally, there was an especially good correlation between the mid-frequency 2T TAA and average gain value when the read head of an entire disc drive was tested. Using regression techniques, the present inventors identified the following equations as describing the relationship between the average gain value and the measured 2T TAA value:

$$TAA = 298.632 - 1.94582 \cdot V + 0.0035143 \cdot V^2 \qquad \text{Eq. 1}$$

$$TAA = 257.845 - 2.02454 \cdot V + 0.0045936 \cdot V^2 \qquad \text{Eq. 2}$$

$$TAA = 224.105 - 1.62403 \cdot V + 0.0033865 \cdot V^2 \qquad \text{Eq. 3}$$

Where equation 1 is for a pattern on an inner diameter, equation 2 is for a pattern on a middle diameter, equation 3 is for a pattern on an outer diameter, TAA is the track average amplitude and V is the average gain value.

Using equations 1–3, it is possible to generate estimates of the TAA values from the average gain values. To measure how well these equations describe the relationship between TAA and average gain value, the present inventors compared estimates of the TAA values generated using equations 1–3 with actual TAA values measured for the same heads. At the inner diameter of 0.7792", the observed R-Square value between the 2T TAA measured value and the estimated TAA was 94.2%. For the middle diameter of 1.3700", the R-Square value was 90.4%. Finally, for the outer diameter of 1.8231", the R-Square value was 87.3%. Other frequencies such as 1T, 7T, and random patterns were tested, but the 2T pattern and the second order linear regression of equations 1–3 were found to provide the closest correlation between TAA and the average gain value.

To determine whether the read head is within specification at step 190, the TAA can be approximated using equations 1, 2 and/or 3 and the average gain values. The approximate TAA is then compared with a specification TAA value or a range of TAA values. If the approximated TAA values are within a desired range for TAA values set by the specification TAA value, the head passes at step 192. Otherwise the head fails at step 194. Alternatively, equations 1–3 can be used to identify an average gain value specification based on a TAA specification. The average gain value specification is then compared with measured gain value to determine whether the read head is operating properly. An indication of whether the head is operating properly is then provided to a user through a user interface 392 that can include a display or a printer.

In one embodiment, the head must have an average gain value that provides a TAA within the desired specifications for each radial position (inner diameter, middle diameter, and outer diameter) where the head is tested in order to pass.

It will be recognized by those skilled in the art that the average gain value and TAA calculation can be performed by firmware placed in the electronics of disc drive 301 such as the host interface microprocessor 306. In such cases, a separate test computer 370 is not needed.

A method of testing a read head 310 in a device 301 comprising producing a read signal using read head 310; setting a variable gain value 336 that is used by a variable gain amplifier 318 to amplify the read signal; and using the variable gain value to determine if the read head 310 is operating properly.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the method and apparatus of testing a device having a read head system while maintaining substantially the same functionality without departing from the scope and spirit of the present invention. In addition, although the preferred embodiment described herein is directed to a screening system for a device having a read head before shipping, it will be appreciated by those skilled in the art that the teachings of the present invention can be applied to a method of testing a read head or an operational retrieval device having a read head to predict baseline instability, without departing from the scope and spirit of the present invention.

What is claimed is:

1. A method of testing a read head in a device, the method comprising:

producing a read signal using the read head;

setting a variable gain value that is used by a variable gain amplifier to amplify the read signal; and using a track average amplitude specification and the variable gain value to determine if the read head is operating properly.

2. The method of claim 1 wherein using the track average amplitude specification and the variable gain value comprises determining an estimated track average amplitude from the variable gain value and comparing the track average amplitude specification to the estimated track average amplitude.

3. The method of claim 1 wherein using the track average amplitude specification and the variable gain value comprises determining a variable gain value specification from the track average amplitude value and comparing the variable gain value specification to the variable gain value.

4. The method of claim 1 wherein the device comprises a storage medium having data patterns stored therein and wherein the method further comprises setting the variable gain value for different positions of the head on the storage medium.

5. The method of claim 4 further comprising storing variable gain values that are set for different positions of the head on the storage medium, averaging the stored variable gain values to form an average variable gain value, and using the average variable gain to determine if the head is operating properly.

6. The method of claim 5 further comprising forming separate average variable gain values for different areas on the storage medium and using the separate average variable gain values to determine if the head is operating properly.

7. The method of claim 1 wherein adjusting the variable gain amplifier comprises using automatic gain control to adjust the variable gain value.

8. A device comprising:

a read head capable of producing a read signal;

a variable gain register capable of holding a variable gain value;

a variable gain amplifier capable of amplifying the read signal based on the variable gain value calculating an estimated track average amplitude;

a memory for storing a plurality of variable gain values; and a processor capable of receiving the variable gain values and capable of determining an average of the variable gain values to produce an average gain value and is further capable of using the average gain value and an estimated track average amplitude to determine the performance of the read head.

9. The device of claim 8 wherein determining the performance of the head comprises calculating an estimated track average amplitude based on the average gain value and comparing the estimated track average amplitude to a specification track average amplitude.

10. The device of claim 9 wherein calculating an estimated track average amplitude is based on the position of the read head over a medium in the device.

11. The device of claim 10 wherein the performance of the head is determined at multiple positions on the medium.

12. The device of claim 11 wherein the multiple positions comprise at least three positions.

13. A device comprising:

a read head capable of producing a read signal;

a variable gain amplifier that amplifies the read signal based on a variable gain value; and means for determining if the read head is operating properly by calculating an estimated track average amplitude based on the variable gain value.

14. The device of claim 13 wherein the estimated track average amplitude is calculated based on an average of a plurality of variable gain values.

15. The device of claim 13 wherein calculating an estimated track average amplitude comprises selecting a function for calculating the estimated track average amplitude based on a location for the read head over a medium in the device.

* * * * *